Patented Sept. 5, 1944

2,357,287

UNITED STATES PATENT OFFICE 2,357,287

MINERAL OIL COMPOSITION

Orland M. Reiff and John J. Giammaria, Woodbury, N. J., assignors to Socony-Vacuum Oil Company, Incorporated, a corporation of New York No Drawing. Application October 30, 1942, Serial No. 463,966

11 Claims. (Cl. 252—32)

This application, which is a continuation-in-part of our copending application Serial No. 353,070, filed August 17, 1940, has to do in a general way with mineral oil compositions and is more particularly related to compositions comprised of a mineral oil fraction and a minor proportion of an added ingredient which will improve such oil fractions in one or more important respects.

It is the principal object of this invention to provide addition agents for use in mineral oil fractions, such as those employed as lubricants, which are multifunctional in that a single addition agent will effect improvement in the pour point and the viscosity index and will retard many of the deleterious effects of oxidation, etc., attending the storage and use of the oil. It is a further object of this invention to provide mineral oil compositions the properties of which have been improved by the incorporation therein of one or more of these novel addition agents.

In Patent No. 2,197,837, issued to one of the present joint inventors, Orland M. Reiff, there is disclosed and claimed a class of multifunctional mineral oil addition agents broadly identified as oil-miscible alkyl-substituted hydroxy-aromatic carboxylic acids in which the alkyl substituent is attached to the aromatic nucleus and contains at least 20 carbon atoms. The compounds disclosed in that patent may, for purposes of description herein, be designated by the general formula

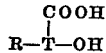

in which T represents an aromatic nucleus, R represents at least one alkyl group of at least 20 carbon atoms, and OH and COOH are attached to the aromatic nucleus T.

The present invention is predicated upon the discovery that the properties of compounds of the type disclosed in the aforesaid patent may be further improved, particularly as to their effectiveness in inhibiting the deleterious effects of oxidation, as, for example, retarding corrosion of alloy bearings, by substituting the hydroxyl hydrogen with an inorganic acyl group and subsequent water-washing of the reaction product so formed; or by substituting more than one such hydroxyl hydrogen atom of more than one phenol carboxylic acid with a polyvalent inorganic acyl group, and subsequent water-washing of the reaction product so formed.

The present invention is predicated also upon the discovery that the closely related acids, specifically the oil-miscible alkyl-substituted hydroxyarylaliphatic carboxylic acids and the oil-miscible alkyl-substituted hydroxyarylcycloaliphatic carboxylic acids, when characterized by the substitution of the hydroxyl hydrogen with an inorganic acyl group of the type described above, will so improve mineral oils. The general class of organic acids contemplated for acylation to form the reaction products contemplated herein may be represented by the general formula

wherein R and T are as described above, R' represents an aliphatic or alicyclic group and $n$ is either 0 or 1.

As contemplated herein, inorganic acyl groups of acidic metalloid elements are considered to be components, or constituents, of the acids of the non-metallic or acidic metalloid elements: phosphorus, silicon and boron. They are derived from an inorganic halide selected from the group consisting of $POCl_3$, $PSCl_3$, $PNCl_2$, $PCl_3$, $PCl_5$, $BCl_3$ and $SiCl_4$, in the reaction of said halide with one of the aforesaid carboxylic acids, followed by subsequent water-washing of the reaction mixture. In the inorganic acyl groups contemplated herein, the non-metallic or acidic metalloid element—P, B or Si—is joined to various groups such as =O, =S, —OH, =N or

in which T, R, R' and N are as given above. As used herein, the term "polyvalent inorganic acyl group" describes those acyl groups present in compounds, or reaction products, containing more than one

group.

Hereinafter, the term "acyl group" is used synonymously with the term "inorganic acyl group" for all of such groups are characterized by the presence of an inorganic element, P, B or Si. And as used herein, the term "acyl" (and the symbol for the same, Ac) is representative of the groups given directly below in Table I and later given in Table II, where the symbol Z represents one of the non-metallic or acidic metalloid elements P, B or Si, and Q represents oxygen or sulphur.

Table I

| $Z=P^{(+3)}, B$ | $Z=Si$ | $Z=P^{(+5)}$ $Q=O$ or $S$ |
|---|---|---|
|  | | |

and

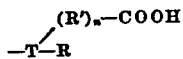

are obtained in the reaction of substantially one mol of the phenol carboxylic acid and substantially one mol of a halide of a non-metallic or acidic metalloid element, and subsequent water-washing of the reaction mixture. The organo-substituted inorganic acyl groups in which more than one of the hydroxyl hydrogens are replaced by $$\underset{-T-R}{(R')_n-COOH}$$

groups, are obtained when more than one mol of the phenol carboxylic acid is reacted with one mol of a halide of the aforesaid type, followed by water-washing of the reaction mixture. Thus, the substitution or acylation of the hydroxyl hydrogen of an alkyl-substituted hydroxyaromatic (or, hydroxyarylaliphatic- or hydroxyarylcycloaliphatic-) carboxylic acid may be effected by reacting the acid with the halide of a non-metallic or acidic metalloid element, and water-washing of the reaction mixture so formed. Examples of the halides which may be used in this acylation reaction are the following: $POCl_3$, $PSCl_3$, $PNCl_2$, $PCl_3$, $PCl_5$, $BCl_3$ and $SiCl_4$. The compound or reaction product obtained by acylating the aforesaid organic acids represented by general Formula I may be broadly classified as an oil-miscible, substantially stable hydroxyaromatic carboxylic acid ester of an inorganic acid, which is an acid of a non-metallic or acidic metalloid element. These acylated compounds or reaction products may be represented by the general formula II 

in which R, R', T and $n$ have the same significance described above in connection with Formula I, and Ac represents an inorganic acyl group as herein defined.

Reaction products, or compounds, of the aforesaid type may be further modified in their properties to condition them for use in particular oils or under particular conditions of use by substituting the carboxyl hydrogen with a metal. Reaction products or compounds, of this type are contemplated herein as a preferred group in the general class of ester derivatives of inorganic acids and may be represented by the general formula III 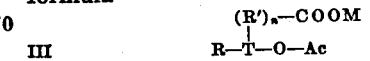

wherein M represents the hydrogen equivalent of a metal and the other symbols have the same significance heretofore defined.

All of the reaction products, or compounds, contemplated herein—that is the alkylated hydroxyaromatic (or, hydroxyarylaliphatic- or hydroxyarylcycloaliphatic-) carboxylic acid esters of the acids of non-metallic or acidic metalloid elements, and the metal salts thereof—may be represented by the general formula IV
$$R-T-O-Ac \quad \overset{(R')_n-COOX}{|}$$

wherein X is selected from the group consisting of hydrogen and a metal and the other symbols have the same significance defined above.

With the modified reaction products, or compounds—that is, those containing metal—which represent a preferred embodiment of the present invention, the term "acyl" is necessarily broadened to include such groups as are tabulated below in Table II, in which all symbols are as hereinbefore defined.

TABLE II

| $Z=P^{(+5)}$, B | $Z=Si$ | $Z=P^{(+5)}$ $Q=O$ or $S$ |
|---|---|---|
| $-Z=O$ | $-Z\overset{OH}{\underset{O}{=}}$ | $-Z=Q\overset{OH}{\underset{OH}{<}}$ |
| $-Z\overset{OH}{\underset{OH}{<}}$ | $-Z\overset{(R')_n-COOX}{\underset{O}{\overset{O-T-R}{\underset{\parallel}{|}}}}$ | $-Z=Q\overset{(R')_n-COOX}{\underset{OH}{\overset{O-T-R}{<}}}$ |
| $-Z\overset{(R')_n-COOX}{\underset{OH}{\overset{O-T-R}{<}}}$ | $-Z\overset{OH}{\underset{OH}{<}OH}$ | $-Z=Q\overset{O-T-R}{\underset{(R')_n-COOX}{<}}$ (with OH branch) |
| $-Z\overset{(R')_n-COOX}{\underset{O-T-R}{\overset{O-T-R}{<}}}\\ (R')_n-COOX$ | $-Z\overset{(R')_n-COOX}{\underset{OH}{\overset{O-T-R}{<}}}OH$ | $-\overset{N}{\underset{\parallel}{Z}}-OH$ |
|  | $-Z\overset{(R')_n-COOX}{\underset{OH}{\overset{O-T-R}{<}}}\overset{O-T-R}{(R')_n-COOX}$ | $-\overset{N}{\underset{\parallel}{Z}}-O-T-R \quad (R')_n-COOX$ |
|  | $-Z\overset{(R')_n-COOX}{\underset{O-T-R}{\overset{O-T-R}{<}O-T-R}}\\ (R')_n-COOX$ |  |

In the metal carboxylate type of compounds, the selection of a metal will depend to a certain extent upon the character of the oil in which the addition agent is to be added and the conditions under which the oil is to be used. Certain metals such as lead, zinc, and tin, for example, may contribute to the oiliness characteristics of the oil. In general, it appears that any metal may be employed as the metal M in carboxylate compounds of the aforesaid type to provide valuable oil addition agents. The metals contemplated herein may be broadly classified as the metals of groups 1 to 8 inclusive of the periodic system capable of forming carboxylate salts. These metals comprise the following: the alkali metals; lithium, sodium, potassium, rubidium, and caesium; the alkaline earth group: beryllium, magnesium, calcium, strontium, and barium; the metals zinc, cadmium, mercury, scandium; the metals aluminium, gallium, indium, thallium, titanium, zirconium, cerium, thorium, germanium, tin and lead; vanadium, columbium, and tantalum; arsenic, antimony, and bismuth; chromium, molybdenum, tungsten and uranium; rhenium, manganese, iron, cobalt and nickel; ruthenium, rhodium and palladium; osmium, iridium and platinum.

Some of the rare earth metals are given in the foregoing. Other rare earth metals suitable for the metal carboxylate type of compounds contemplated herein are those now commercially available as the cerium and yttrium group; namely, a mixture of praseodymium, neodymium, samarium, europium, gadolinium, terbium, dysprosium, holmium, erbium, thallium and lutecium.

As aforesaid, the starting materials for obtaining ester compounds of the type contemplated herein are the alkylated hydroxyaromatic carboxylic acids of the type described in Patent No. 2,197,837, to which reference is made herein for a detailed description of ingredients and procedures used in their synthesis as well as details in their chemical composition. And, as aforesaid, the starting materials may be the closely related alkylated hydroxyarylaliphatic carboxylic acids and alkylated hydroxyarylcycloaliphatic carboxylic acids, the synthesis and chemical composition of which will be suggested by the detailed description of ingredients and procedures given in the foregoing patent, and is further amplified in Patent No. 2,198,275 issued to Reiff et al. on April 23, 1940.

In general, these alkylated phenol carboxylic acids may be obtained by first alkylating a phenolic compound such as phenol or naphthol (substituted or unsubstituted) in any suitable manner as by a Friedel-Crafts condensation with a halogenated high molecular weight aliphatic hydrocarbon such as chlorinated paraffin wax. As pointed out in the patents above referred to, it is desirable in obtaining a product having pour depressant and V. I. improving properties that the alkylated aryl nucleus have at least one alkyl substituent of at least 20 carbon atoms. It is therefore desirable that the aliphatic hydrocarbon, whether a pure compound or mixture of compounds, be predominantly comprised of high molecular weight aliphatic hydrocarbons, and since petroleum wax is a preferred source of such high molecular weight alkyl substituents, the products so alkylated are, as in the aforesaid patent, identified herein as being "wax"-substituted.

Following alkylation, the alkylated phenol is converted to an alkali metal phenate, which is then carboxylated to form the alkylated phenol alkali metal carboxylate. The carboxylate is then acidified with a mineral acid to form the alkylated phenol carboxylic acid. To facilitate handling, the foregoing synthesis is carried out in mineral oil solution so that the ultimate product is a mineral oil solution of the alkylated hydroxyaromatic carboxylic acid.

In the event chlorinated paraffin wax (or a chlorinated aliphatic hydrocarbon of the type which characterizes chlorinated paraffin wax) is used as the alkylating agent, the product obtained is referred to as "wax-substituted." To further identify these "wax-substituted" products, we have followed the custom employed in the aforesaid patents of using the parenthetical expression (A—B), indicating with "A" the number of atomic proportions of chlorine in the chlorinated wax reacted with one mol of phenol and indicating with "B" the percentage chlorine content of the chlorinated wax. Thus, wax-phenol carboxylic acid (3—16) indicates that the wax-phenol used in obtaining the acid is the product obtained by reacting one mol of phenol with a quantity of chlorinated wax (of 16% chlorine content) containing 3 atomic proportions of chlorine.

The acylation of the hydroxyl group in the aforesaid hydroxyaromatic carboxylic acid is accomplished by slowly adding the halide of a nonmetallic or acidic metalloid element to a mineral oil solution of the alkylated hydroxyaromatic acid at an elevated temperature in the neighborhood of 150° F. After such addition the mixture is heated at a temperature of about 300° F. until the reaction is complete, after which it is cooled to about 150° F., diluted with a suitable solvent such as benzol, and water-washed free of mineral acid, after which the solvent is distilled off to obtain the finished acid ester.

In order to further describe the acylation, or substitution, procedure for the preparation of the reaction products or compounds contemplated herein, a series of reactions which are believed to take place are explained by the following:
When a typical, and preferred, halide, PCl₃, is reacted with a typical hydroxyaromatic carboxylic acid, wax phenol carboxylic acid (3—16), in substantially equimolecular proportions, it is believed that the carboxylic acid group

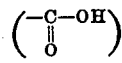

is converted to the corresponding chlorcarbonyl group

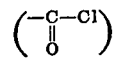

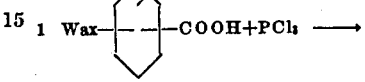

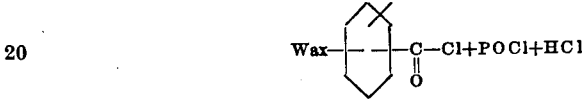

and the hydroxyl group is converted to the phosphorous acid group (—O—P=O),

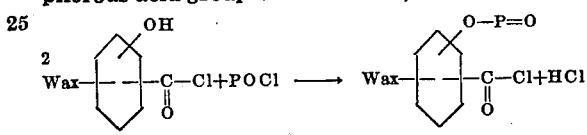

With water-washing, the chlorcarbonyl group

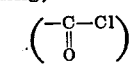

in the final product of Reaction 1–2, is converted back to the carboxylic acid group

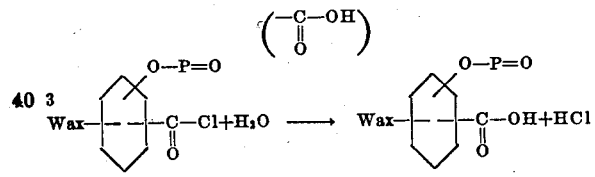

Similarly, when another typical halide, PCl₅, is reacted with the same acid, wax phenol carboxylic acid (3—16), in substantially equimolecular proportions, it is believed that the carboxylic acid group $\left(\begin{array}{c}-C-OH\\ \| \\ O\end{array}\right)$ is converted to the corresponding chlorcarbonyl group $\left(\begin{array}{c}-C-Cl\\ \| \\ O\end{array}\right)$

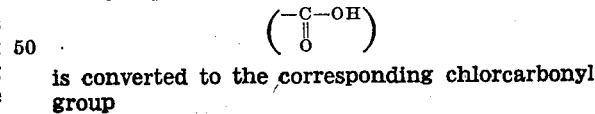

and the hydroxyl group is converted to the phosphoric acid dichloride group

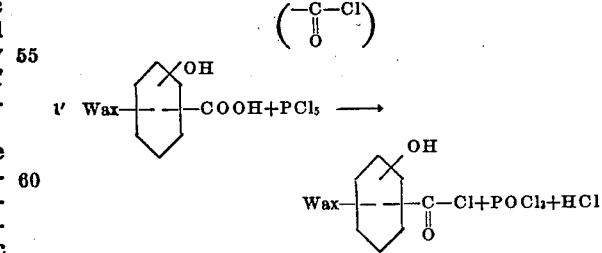

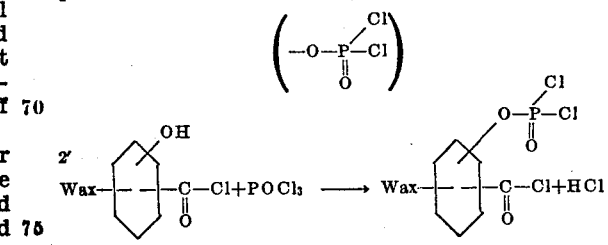

With water-washing, the chlorcarbonyl group

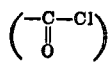

in the final product of Reaction 1'–2' is converted back to the carboxylic acid group

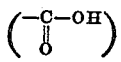

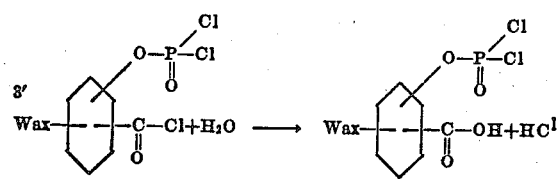

and the phosphoric acid dichloride group

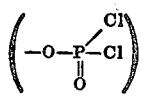

in the final product of Reaction 1'–2' is converted to the phosphoric acid group

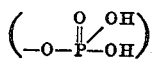

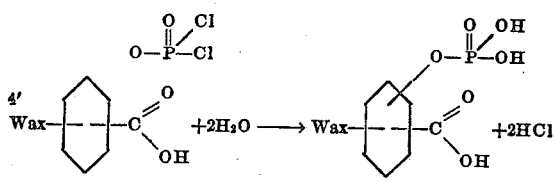

As aforesaid, the reaction products or compounds contemplated by the present invention are substantially free of halogen, which distinguishes the same from the subject matter of U. S. Patent No. 2,259,452 with which we are familiar. This patent is directed to mineral oil compositions comprising mineral oil fractions and aromatic ortho-phosphito carboxylic acid chlorides and derivatives thereof. As described therein such compounds or reaction products may be characterized either by the presence of a chlorcarbonyl group,

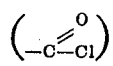

or by the presence of a substituted carbonyl group,

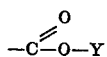

wherein Y represents the organic residue of an organic compound containing a replaceable hydrogen atom or a replaceable metal atom. In the procedure of that patent the replaceable hydrogen or metal is removed in the reaction with the aromatic ortho-phosphito carboxylic acid chloride by formation of a chloride of the said hydrogen or metal atom which is released as a gas or as a precipitate. In short, compounds or reaction products described in the aforesaid patent are not characterized by the presence of a carboxyl group nor by a metal carboxylate group, as are those compounds or reaction products contemplated by the present invention, and in this regard the compounds or reaction products of the present invention distinguish over those of the aforementioned patent.

In the synthesis of compounds in which the carboxyl-hydrogen is substituted with metal, the preferred procedure is to first form the alkali metal carboxylate by reaction of the acid ester, the formation of which has been described above, with an alkali metal alcoholate. Other desired metals can then be substituted by double decomposition of the alkali metal carboxylate with a normal inorganic or fatty acid salt of the desired metal.

Further details in the procedure which may be followed in synthesizing the acylated (esterified) reaction products or compounds contemplated herein may be obtained from the following specific examples describing the preparation of the wax-phenol carboxylic acid (3—16) ester of phosphorous acid and the metal carboxylate derivatives thereof.

In Examples I and II below, the acyl group (Ac) of general Formula IV is derived from PCl₃ and probably has the group formula

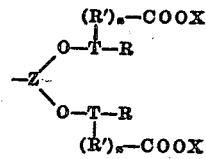

wherein Z of the group formula of Table II is trivalent phosphorus (P³).

EXAMPLE I

Reaction mixture

| | Grams |
|---|---|
| Wax-phenol carboxylic acid (3—16) | 50 |
| Mineral oil | 150 |
| PCl₃ | 3.34 |

Procedure

The PCl₃ was added dropwise at 150° F. to the wax-phenol carboxylic acid in a flask equipped with a reflux condenser. When the addition was completed, the temperature was slowly raised to 300° F. and held over a 2-hour period to complete the reaction. The mixture was then cooled to about 150° F., diluted with benzol and water-washed free of acid, after which the solvent was distilled off to obtain the finished product, the wax-phenol carboxylic acid (3—16) ester of phosphorous acid. This product, which is typical of the products contemplated herein, contains phosphorus in addition to the elements carbon, hydrogen and oxygen.

EXAMPLE II

Reaction mixture

| | | |
|---|---|---|
| Wax-phenol carboxylic acid (3—16) ester of phosphorous acid | grams | 50 |
| Mineral oil | do | 150 |
| Metallic sodium | do | 1.68 |
| CoCl₂ | do | 4.75 |
| Butyl alcohol | c. c. | 100 |

Procedure

The ester of phosphorous acid was dissolved in the butyl alcohol and the sodium added in thin strips. The reaction mixture was then heated about ½ hour at 250° F. to form the sodium salt. A butyl alcohol solution of CoCl₂ was slowly added. The temperature was raised to 300° F., and the alcohol was distilled. The mixture was then cooled, diluted with benzol and filtered. The solvent was distilled to obtain the finished product, the wax-phenol cobaltous carboxylate (3—16) ester of phosphorous acid.

To demonstrate the improved properties obtained in mineral oil blends containing addition agents of the type discussed herein, we have conducted several comparative tests with representative mineral oils alone and with the same oils blended with these improving agents. The results of these tests are disclosed in the following examples.

Pour point depressant action

These tests were conducted with a motor oil having a Saybolt Universal viscosity of 67 seconds at 210° F. and a pour point of +20° F. The pour points of blends formed from this oil and representative acylated wax-phenol carboxylic acids and metal carboxylates of the type contemplated herein are listed in Table III below, from which it will be observed that these reaction products or compounds, the esters of inorganic acids of non-metallic or acidic metalloid elements are highly effective pour point depressants.

TABLE III

| Addition agent | Per cent | A. S. T. M. pour test °F. |
|---|---|---|
| Wax-phenol carboxylic acid (3–16) ester of phosphorous acid | ¼ | −25 |
| Wax-phenol cobaltous carboxylate (3–16) ester of phosphorous acid | ¼ | −20 |
| Wax-phenol vanadyl carboxylate (3–16) ester of phosphorous acid | ¼ | −20 |
| Wax-phenol stannous carboxylate (3–16) ester of phosphorous acid | ¼ | −20 |
| Wax-phenol carboxylic acid (3–16) ester of phosphoric acid | ¼ | −20 |
| Wax-phenol cobaltous carboxylate (3–16) ester of phosphoric acid | ¼ | −25 |
| Wax-phenol carboxylic acid (3–16) ester of silicic acid | ¼ | −20 |

Viscosity index improvement

The data listed in Table IV below showing the effectiveness of the addition agents contemplated herein for improving viscosity index were obtained in the conventional manner from the Saybolt viscosity of the oil and the oil blends at 100° F. and 210° F. The oil used was a viscous mineral oil of the lubricant type.

TABLE IV

| Improving agent | Percent by wt. | S. U. viscosity 100° F. | S. U. viscosity 210° F. | V. I. |
|---|---|---|---|---|
| None | | 140.7 | 41.8 | 79.3 |
| Wax-phenol carboxylic acid (3–16) ester of phosphorous acid | 1 | 152.1 | 42.8 | 87.0 |
| Wax-phenol cobaltous carboxylate (3–16) ester of phosphorous acid | 1 | 154.9 | 43.0 | 87.5 |
| Wax-phenol vanadyl carboxylate (3–16) ester of phosphorous acid | 1 | 153.7 | 42.9 | 86.9 |
| Wax-phenol carboxylic acid (3–16) ester of phosphoric acid | 1 | 153.7 | 42.9 | 86.9 |
| Wax-phenol cobaltous carboxylate (3–16) ester of phosphoric acid | 1 | 153.9 | 43.1 | 91.4 |
| Wax-phenol carboxylic acid (3–16) ester of silicic acid | 1 | 152.8 | 42.9 | 88.4 |

Operation test

In addition to the foregoing tests we have also made comparative tests between an oil and an oil blend containing representative improving agents of the type contemplated herein to determine comparative behavior of the unblended oil and the improved oil under actual operating conditions. The tests were carried out in a single cylinder C. F. R. engine operated continuously over a time interval of 28 hours with the cooling medium held at a temperature of about 390° F. and the oil temperature held at a temperature of about 150° F. The engine was operated at a speed of 1200 R. P. M.

The oil used in the test was a lubricating oil stock of 120 seconds Saybolt viscosity at 210° F., and the conditions observed were:

a. The extent to which the piston rings were stuck;
b. The extent to which the oil rings were filled with deposit;
c. The amount of carbonaceous deposit in the oil; and
d. The neutralization number or acidity (N. N.) of the oil.

The results obtained in these tests are set forth in Table V below, wherein oils $A_1$ and $A_2$ represent the oil alone; oil $B_1$ represents the same oil containing 1% of the wax-phenol carboxylic acid (3—16) ester of phosphorous acid, and oil $B_2$ is the same as oil $A_2$ with ½% of the wax-phenol cobaltous carboxylate (3—16) ester of phosphoric acid.

TABLE V

| Oil | Ring condition | | | | | | | | Grams carbon deposit | N. N. | S. U. visc., 210° F. |
|---|---|---|---|---|---|---|---|---|---|---|---|
| | Degrees stuck | | | | | Percent slots filled | | | | | |
| | 1 | 2 | 3 | 4 | 5 | 3 | 4 | 5 | | | |
| $A_1$ | 270 | 360 | 360 | 360 | 360 | 75 | 75 | 75 | 16.5 | 1.7 | 141.6 |
| $B_1$ | 0 | 0 | 0 | 0 | 0 | 10 | 0 | 0 | 5.0 | 1.1 | 131.4 |
| $A_2$ | 180 | 0 | 360 | 180 | 60 | 75 | 75 | 30 | 11.4 | 2.0 | 134.9 |
| $B_2$ | 0 | 0 | 0 | 0 | 0 | 0 | 0 | 0 | 4.0 | 2.9 | 135.0 |

Corrosion inhibition

In order to demonstrate the effectiveness of the mineral oil addition agents of the present invention in inhibiting the deleterious effects of oxidation upon mineral oils, and in addition to demonstrate the surprising superiority of said agents over the compounds disclosed in the aforesaid Patent No. 2,197,837, a mineral oil blank and typical mineral oil blends were subjected to the following corrosion test. One typical mineral oil blend contained a representative product of the present invention—wax-phenol carboxylic acid (3—14) ester of phosphorous acid (phosphorus content, 1.62%); the other blend contained a representative product of the aforesaid patent—wax-phenol carboxylic acid (3—14).

The test involved placing in a test tube a weighed section of a metal bearing and a 30 gram sample of the oil, or oil blend, and heating the oil sample to about 175° C. for 22 hours while bubbling a stream of air at the rate of 2 liters per hour against the surface of the bearing. The height of the oil in the test tube is maintained at a constant level, thus any oil lost by evaporation is replaced by additional oil. The weight loss in milligrams of the bearing is taken as the measure of the corrosiveness of the oil, or oil blend. The oil used in each test run was a mineral oil having an A. P. I. gravity of 31.4 and a Saybolt Universal viscosity at 311.4 seconds at 100° F. The results of these tests are given below in Table VI.

TABLE VI

| | Addition agent | Per cent added | Bearing loss, mgms. |
|---|---|---|---|
| | None | | 38 |
| A | Wax-phenol carboxylic acid (3–14) | 0.5 | 34 |
| B | Wax-phenol carboxylic acid (3–14) ester of phosphorous acid | 0.5 | 0 |

From the foregoing test results, it will be seen that the acylated compound (B) is much more effective in retarding bearing corrosion than the wax phenol carboxylic acid (A) of the patent, from which it was derived.

The amount of the improving agent used may be varied, depending upon the mineral oil with which it is blended and the properties desired in the final oil composition. The esters of inorganic acids of non-metallic or acidic metalloid elements as described hereinabove may be used in amounts ranging from ¼% to about 10%, and in general compositions of the desired improved properties may be obtained with amounts in the neighborhood of 1%.

We claim:

1. An improved mineral oil composition comprising a mineral oil having admixed therewith a minor proportion of an oil-miscible, substantially stable ester of an inorganic acid of an acidic metalloid element selected from the group consisting of phosphorus, silicon and boron, and of an organic hydroxy compound selected from the group consisting of an alkyl-substituted hydroxyaromatic carboxylic acid, an alkyl-substituted hydroxyarylaliphatic carboxylic acid, and an alkyl-substituted hydroxyarylcycloaliphatic carboxylic acid, in which the carboxyl hydrogen is substituted with metal and in which the alkyl substituent is attached to the aromatic nucleus and contains at least 20 carbon atoms.

2. An improved mineral oil composition comprising a mineral oil having admixed therewith a minor proportion of an oil-miscible substantially stable ester of an inorganic acid of an acidic metalloid element selected from the group consisting of phosphorus, silicon and boron, and of an organic hydroxy compound selected from the group consisting of an alkyl-substituted hydroxyaromatic carboxylic acid, an alkyl-substituted hydroxyarylaliphatic carboxylic acid, and an alkyl-substituted hydroxyarylcycloaliphatic carboxylic acid, in which the carboxyl hydrogen is substituted with metal and in which the alkyl substituent is attached to the aromatic nucleus, said alkyl substituent being an aliphatic group of the type which characterizes petroleum wax.

3. An improved mineral oil composition comprising a mineral oil having admixed therewith a minor proportion of a wax-substituted phenol carboxylic acid ester of phosphoric acid.

4. An improved mineral oil composition comprising a mineral oil having admixed therewith a minor proportion of a wax-substituted phenol carboxylic acid ester of phosphoric acid in which ester the carboxyl hydrogen has been substituted with metal.

5. An improved mineral oil composition comprising a mineral oil having admixed therewith a minor proportion of a wax-phenol carboxylic acid ester of silicic acid.

6. An improved mineral oil composition comprising a mineral oil having admixed therewith a minor proportion of a wax-substituted phenol carboxylic acid ester of silicic acid in which ester the carboxyl hydrogen has been substituted with metal.

7. An improved mineral oil composition comprising a mineral oil having admixed therewith a minor proportion of an oil-miscible, substantially stable ester of a phosphoric acid, and of an organic hydroxy compound selected from the group consisting of an alkyl-substituted hydroxyaromatic carboxylic acid, an alkyl-substituted hydroxyarylaliphatic carboxylic acid and an alkyl-substituted hydroxyarylcycloaliphatic carboxylic acid, in which the alkyl substituent is attached to the aromatic nucleus and contains at least 20 carbon atoms.

8. An improved mineral oil composition comprising a mineral oil having admixed therewith a minor proportion of an oil-miscible, substantially stable ester of a phosphoric acid, and of an organic hydroxy compound selected from the group consisting of an alkyl-substituted hydroxyaromatic carboxylic acid, an alkyl-substituted hydroxyarylaliphatic carboxylic acid, and an alkyl-substituted hydroxyarylcycloaliphatic carboxylic acid, in which the alkyl substituent is attached to the aromatic nucleus, said alkyl substituent being an aliphatic group of the type which characterizes petroleum wax.

9. An improved mineral oil composition comprising a mineral oil having admixed therewith a minor proportion of an oil-miscible, substantially stable ester of an acid of phosphorus, and of an organic hydroxy compound selected from the group consisting of an alkyl-substituted hydroxyaromatic carboxylic acid, an alkyl-substituted hydroxyarylaliphatic carboxylic acid, and an alkyl-substituted hydroxyarylcycloaliphatic carboxylic acid, in which the carboxyl hydrogen is substituted with metal and in which the alkyl substituent is attached to the aromatic nucleus and contains at least 20 carbon atoms.

10. An improved mineral oil composition comprising a mineral oil having admixed therewith a minor proportion of a wax-substituted phenol carboxylic acid ester of boric acid.

11. An improved mineral oil composition comprising a mineral oil having admixed therewith a minor proportion of a wax-substituted phenol carboxylic acid ester of boric acid in which ester the carboxyl hydrogen has been substituted with metal.

ORLAND M. REIFF.
JOHN J. GIAMMARIA.